(12) United States Patent
Perez et al.

(10) Patent No.: US 11,783,043 B2
(45) Date of Patent: Oct. 10, 2023

(54) METHODS FOR AUTHENTICATION OF FIRMWARE IMAGES IN EMBEDDED SYSTEMS

(71) Applicant: ZT Group Int'l, Inc., Secaucus, NJ (US)

(72) Inventors: Oscar Alfredo Perez, Pflugerville, TX (US); John Woo, Austin, TX (US)

(73) Assignee: ZT GROUP INT'L, INC., Secaucus, NJ (US)

( * ) Notice: Subject to any disclaimer, the term of this patent is extended or adjusted under 35 U.S.C. 154(b) by 0 days.

(21) Appl. No.: 17/533,305

(22) Filed: Nov. 23, 2021

(65) Prior Publication Data

US 2023/0161881 A1 May 25, 2023

(51) Int. Cl.
*G06F 21/57* (2013.01)

(52) U.S. Cl.
CPC .......... *G06F 21/575* (2013.01); *G06F 21/572* (2013.01)

(58) Field of Classification Search
CPC .............................. G06F 21/575; G06F 21/572
See application file for complete search history.

(56) References Cited

U.S. PATENT DOCUMENTS

| 2006/0149958 A1* | 7/2006 | Omathuna | G06F 9/445 |
| | | | 713/2 |
| 2011/0138192 A1* | 6/2011 | Kocher | G06F 8/71 |
| | | | 713/189 |
| 2019/0073478 A1* | 3/2019 | Khessib | G06F 13/4282 |
| 2019/0171821 A1* | 6/2019 | Asano | H04L 9/0827 |

FOREIGN PATENT DOCUMENTS

CN 106325929 A * 1/2017 ............... G06F 8/65

* cited by examiner

*Primary Examiner* — Ji H Bae
*Assistant Examiner* — Hyun Soo Kim
(74) *Attorney, Agent, or Firm* — POLSINELLI PC

(57) ABSTRACT

A method is provided for authenticating firmware images in an embedded system. The method may include loading and executing a trusted firmware using a pre-existing Secure Boot on a baseboard management controller (BMC). The BMC is configured as a master for an embedded system including System On Chips (SOCs) configured as slaves, out-of-band interfaces between the BMC and the SOCs, and flash storages in electrical communication with the SOCs. The method may also include pushing or uploading, by the BMC, a secure SOC firmware image to one of the SOCs using one of the out-of-band interfaces, verifying a digital signature extracted from the SOC firmware image by using a hash code calculated from the SOC firmware image and decrypted using a public key stored on the BMC and notifying a user about verification of the digital signature.

20 Claims, 5 Drawing Sheets

METHODS FOR AUTHENTICATION OF FIRMWARE IMAGES IN EMBEDDED SYSTEMS

FIELD

The disclosure is directed to methods for authenticating firmware images in embedded systems. In particular, the disclosed methods allow running BootStrap locally on System-On-Chips (SOCs).

BACKGROUND

Current embedded systems include multiple System-On-Chips (SOCs) performing different tasks. Most customers desire to have an option to upgrade their firmware versions.

There is an increased need for securing the embedded system. As more hardware and software modules are added to new designs of the embedded systems, the newly designed embedded systems become more complex and thus become vulnerable to attacks.

Many of the SOCs in the market today do not implement a feature known as "Secure Boot" that prevents these SOCs from executing codes that are not authentic. Because most SOCs do not implement "Secure Boot," there remains a need for developing alternative methods to reduce the chances of executing unauthorized codes.

BRIEF SUMMARY

In one aspect, a method is provided for authenticating firmware images in an embedded system. The method may include loading and executing a trusted firmware using a pre-existing Secure Boot on a baseboard management controller (BMC), wherein the BMC is configured as a master for an embedded system comprising a plurality of System On Chips (SOCs) configured as slaves, out-of-band interfaces between the BMC and the plurality of SOCs, and a plurality of flash storages in electrical communication with the plurality of SOCs. The method may also include pushing or uploading, by the BMC, a secure SOC firmware image to one of the plurality of SOCs using one of the out-of-band interfaces, wherein signature verification of a SOC firmware image is performed locally on one of the plurality of SOCs. The method may also include verifying, by the BMC, a digital signature extracted from the SOC firmware image by using a hash code calculated from the SOC firmware image and decrypted using a public key stored on the BMC. The method may also include notifying, by the BMC, a user about verification of the digital signature.

Additional embodiments and features are outlined in part in the description that follows and will become apparent to those skilled in the art upon examination of the specification or may be learned by the practice of the disclosed subject matter. A further understanding of the nature and advantages of the disclosure may be realized by reference to the remaining portions of the specification and the drawings, which form a part of this disclosure.

BRIEF DESCRIPTION OF THE DRAWINGS

The description will be more fully understood with reference to the following figures and data graphs, which are presented as various embodiments of the disclosure and should not be construed as a complete recitation of the scope of the disclosure, wherein.

DETAILED DESCRIPTION

The disclosure may be understood by reference to the following detailed description, taken in conjunction with the drawings as described below. It is noted that, for purposes of illustrative clarity, certain elements in various drawings may not be drawn to scale.

Due to design limitations, many SOCs in the current market cannot ensure that they SOCs run trusted firmware without an external method of authentication. An embedded system includes multiple SOCs performing different tasks. It is desirable for the firmware that runs on these SOCs to have an option, which allows an end-user to upgrade their firmware versions.

The disclosure provides an embedded system that includes interfaces to enable updating or changing the firmware image that currently runs on these SOCs. These SOCs do not feature "Secure Boot", but feature interfaces, such as Joint Test Action Group (JTAG), universal asynchronous receiver-transmitter (UART), Low Pin Count (LPC), Serial Peripheral Interface (SPI), Enhanced Serial Peripheral Interface (eSPI), or Inter-Integrated Circuit (I2C), among others. The interfaces are also referred to as out-of-band interfaces. The out-of-band interfaces allow read access to a storage device where the SOC firmware images are stored, such as a flash storage device.

The disclosure provides a method including performing authentication of SOC firmware using out-of-band interfaces for SOCs. The method configures an entity (e.g. master) on the embedded system that runs a trusted firmware image, and pushes or uploads special BootStrap images to other entities (e.g. slave SOCs) to verify SOC firmware images. The disclosed method can help secure the embedded system.

The disclosed method ensures that the SOC firmware images being pushed as an update are authentic by using cryptography. Firmware may be digitally signed by a trusted authority. Most importantly, firmware that is currently running on these SOCs may verify that the digital signature is authentic and thus allows the SOC firmware image to be committed to flash storage devices for the SOCs.

Figure 1:
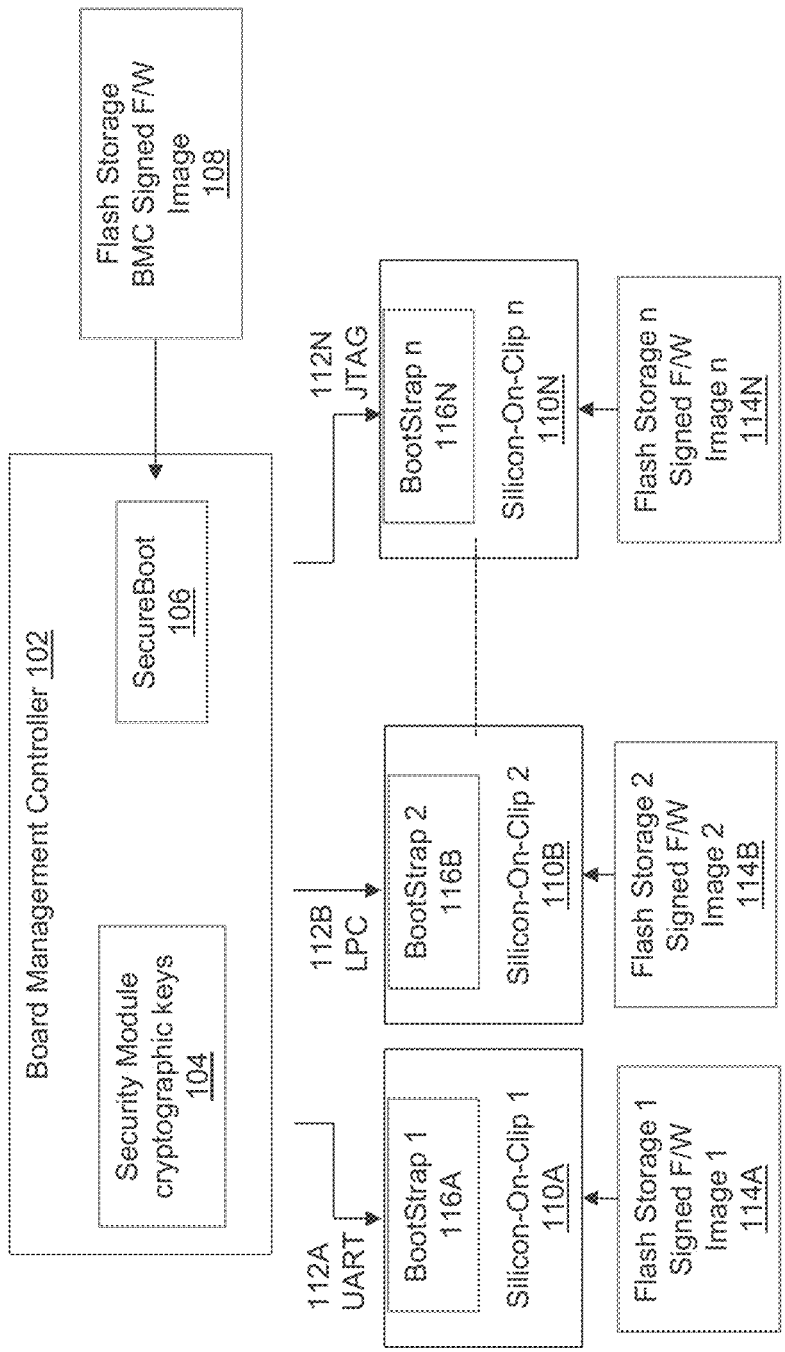
FIG. 1 is a system diagram of an embedded system in accordance with an embodiment of the disclosure.

FIG. 1 is a system diagram of an embedded system in accordance with an embodiment of the disclosure. An embedded system 100 is a computer system or a combination of a computer processor, computer memory, and input/output peripheral devices. The embedded system 100 may have a dedicated function within a mechanical system or an electronic system. The computer system is embedded as part of a device or machine, which often includes electronic hardware and mechanical parts. Because the embedded system 100 typically controls operations of the device or machine in which the embedded system is embedded, the embedded system 100 often has real-time computing constraints.

The embedded system 100 configures one Baseboard Management Controller (BMC) SOC or BMC 102 acting as a Master and, one or more SOCs 110A, 110B, or 110N acting as slave(s). The BMC SOC 102 includes a stand-alone security module 104 where the keys used for cryptographic functions are securely stored. Also, the BMC SOC 104 is configured as a trusted agent using a pre-existing Secure Boot feature 106. To act as the Master of the embedded system, the BMC SOC 102 includes interfaces 112A, 112B, or 112N, such as JTAG Master, UART, LPC, SPI, eSPI, GPIO, or I2C, among others. The interfaces 112A, 112B, or 112N can communicate with the slave SOCs 110A, 110B, or 110N in the embedded system.

Firmware is a specific class of computer software that provides a control for the hardware of the embedded system, such as SOCs, interfaces, and flash storage, etc. The firmware may contain basic functions and may provide hardware abstraction services to higher-level software such as operating systems. For less complex devices, firmware may act as the device's complete operating system, performing all control, monitoring, and data manipulation functions. Typical examples of devices containing firmware are embedded systems, home, and personal-use appliances, computers, and computer peripherals.

The BMC firmware image is stored in flash storage 108 in electrical communication with BMC 102. Common reasons for updating firmware include fixing bugs or adding features to SOCs.

The BMC firmware 106 (e.g. Secure Boot) that runs on the BMC SOC 102 performs the authentication of every SOC firmware image using one or more of these interfaces.

As shown, BMC 102 is connected to other SOCs 110 A, 110B, or 110N in the embedded system 100. BMC 102 uses a pre-existing Secure Boot 106 to load a trusted firmware image from its own flash storage 108. For example, the trusted firmware image is a BMC firmware image. BMC 102 can execute a trusted BMC firmware to fully operate itself.

The pre-existing Secure Boot 106 is a security standard firmware developed by members of the Personal Computer (PC) industry to help make sure that a device boots using software that is trusted by the Original Equipment Manufacturer (OEM). When the PC starts, the Secure Boot firmware checks the signature of each boot software, including Unified Extensible Firmware interface (UEFI) firmware drivers (also known as Option ROMs), Elec..tronfr:.s for rnagng (EFI) applications, and the operating system. If the signatures are valid, the PC boots and the Secure Boot firmware give control to the operating system. The OEM can create Secure Boot keys and store the keys in the PC firmware. When a user adds UEFI drivers, the user makes sure that these UEFI drivers are signed and included in a Secure Boot database.

Secure Boot 106 includes a boot sequence in which each software image or firmware image loaded and executed on a device (e.g. BMC 102) is authorized. The Secure Boot 106 guarantees that valid third-party firmware codes can run in the OEM. Any third-party firmware code is not trusted, including the bootloader installed by the Operating System Vendor (OSV) and peripherals provided by an Independent Hardware Vendor (IHV). End-users may choose to enroll and revoke entries in a Secure Boot image security database as part of managing verification policy.

Secure Boot 106 includes two parts, i.e. verification of the boot image and verification of firmware updates to the image security database. Once BMC 102 is fully operational, BMC 102 begins using interfaces 112A, 112B, and 112N to connect to each of slave SOCs 110A, 110B, and 110N to upload a special SOC firmware image 116A, 116B, or 116N (e.g. BootStrap image). The SOC firmware is then executed by each SOC. SOC BootStrap 116A, 116B, or 116N runs natively on each of the slave SOCs 110A, 110B, and 110N and supports authentication of the slave SOC image in either of the following two ways. One way is to read the slave SOC firmware image from flash storage 114A, 11B, or 114N and then send the slave SOC firmware image to BMC 102 for authentication. Another way is to read the slave SOC firmware image from flash storage 114, 114B, or 114N, to calculate a cryptographic hash code or a hash value of the slave SOC firmware image, and to report the hash code or value along with a digital signature back to BMC 102. It is desirable to run the SOC BootStrap 116A, 116B or 116C on slave SOCs 110A, 110B, or 110N.

Digital signature schemes normally include two algorithms, one signing algorithm for signing a message using a private key, and one verifying algorithm for verifying the signatures which involves a public key.

Digital signatures can be used to authenticate an identity of a sender for a message, a signer for a document or, a signer for a software package or a firmware release. The digital signatures can also ensure that the original contents of the message, the document, the software package, or the firmware release have not been altered.

The digital signatures can be created by calculating a hash code from texts and encrypting the hash code with a private key of the sender to create a digitally signed document. The digital signatures can also be verified by calculating a hash code from the texts and decrypting the signature with the public key of the sender.

Hashing is a method of cryptography that converts any form of data into a unique string of text. Hashing is a mathematical operation that is easy to perform to generate a hash code from texts. Any type of data can be hashed. Regardless of the size or type of the data, the hash code or value has the same length. The hash code or value is designed to act as a one-way function. For example, when data are put into a hashing algorithm, a unique string can be obtained. A unique set of data produces the same hash code or value.

Figure 2:
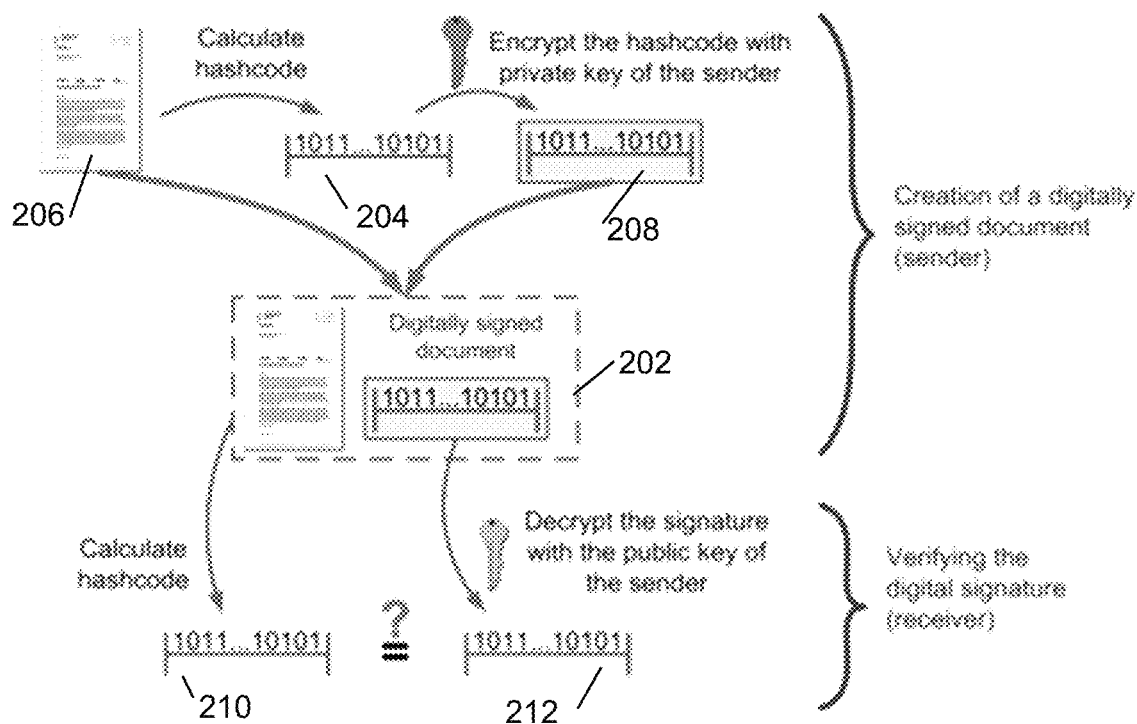
FIG. 2 illustrates how to create and verify digital signatures in accordance with an embodiment of the disclosure.

FIG. 2 illustrates how to create and verify digital signatures in accordance with an embodiment of the disclosure. As illustrated, to create a digitally signed document 202 by a sender (e.g. slave SOC), a hash code 204 is calculated based upon data or text image 206 by the sender. The hash code 204 is then encrypted by using a private key of the sender to have an encrypted hash code 208. A digital signature is extracted from the data or text image 206. The digitally signed document 202 includes the digital signature extracted from data or text image 206 and encrypted hash code 208.

To verify the digital signature by a receiver (e.g. BMC), the hash code 210 is calculated based upon the data or text image 206 in the digitally signed document 202 by the receiver. The encrypted hash code 208 is decrypted using a public key of the sender to have a decrypted hash code 212, which is compared with the calculated code 210 by the receiver. If the calculated hash code does not match the calculated had code based upon the decrypted signature using the public key of the sender, the signature is not authentic, which may be because the document has been changed after signing or because the signature has not been generated with the private key of the sender.

Figure 3:
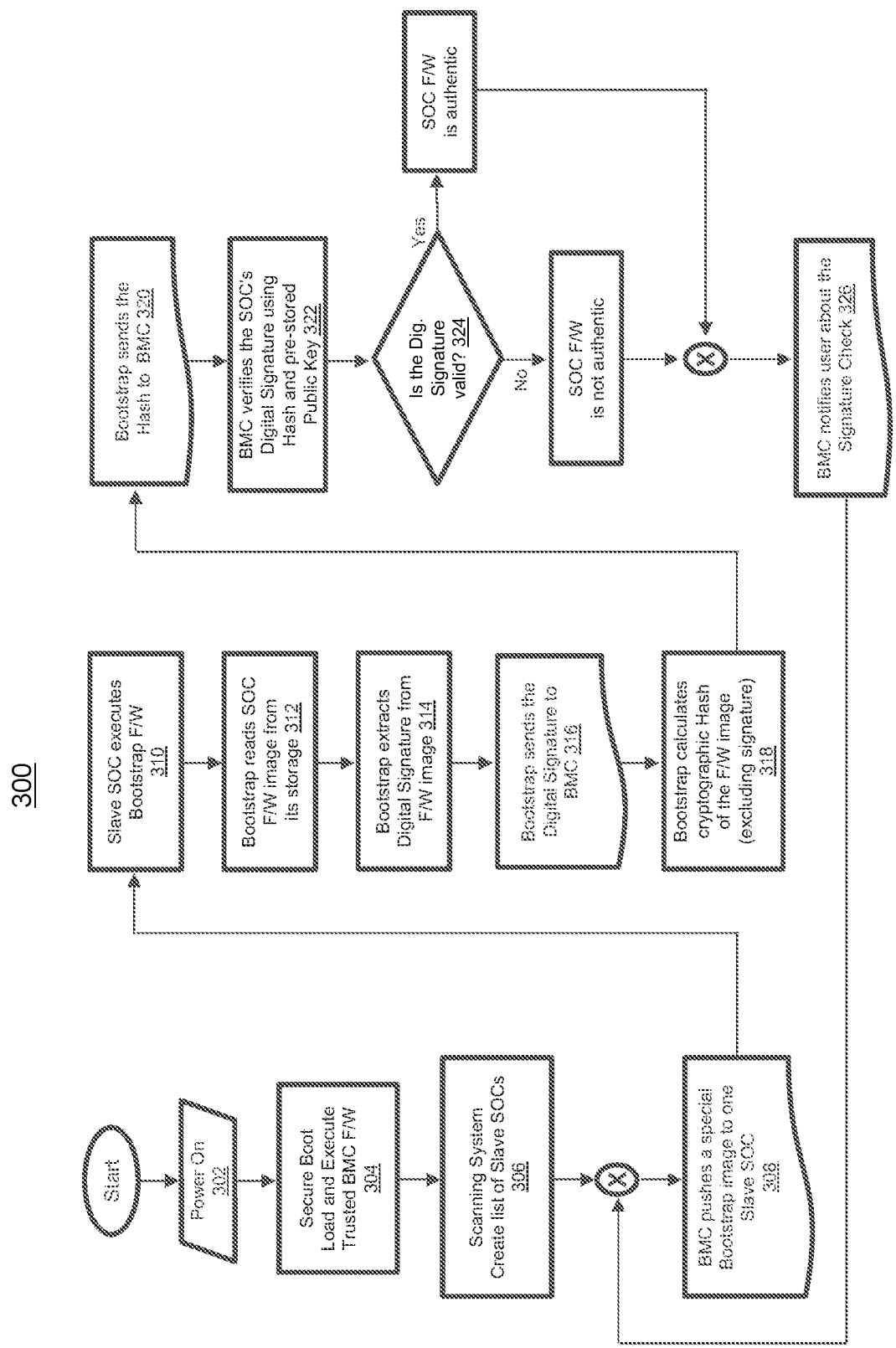
FIG. 3 is a flow chart illustrating operations of the embedded system of FIG. 1 in accordance with an embodiment of the disclosure.

FIG. 3 is a flow chart 300 illustrating operations of the embedded system of FIG. 1 in accordance with an embodiment of the disclosure. After the embedded system 100 is powered on at 302, Secure Boot 106 on BMC 102 loads and executes a trusted BMC firmware at operation 304. Then, a scanning system on BMC 102 creates a list of slave SOCs. At 308, BMC 102 pushes or uploads a special BootStrap image to one slave SOC. At 310, slave SOC 110A, 110B or 110N executes BootStrap firmware 116A, 116B, or 116N.

One benefit of the disclosed method is fast speed, because the BootStrap firmware 116A, 116B, or 116C runs locally on the SOC. The BootStrap firmware 116A, 116B, or 116c executes locally on the SOC at its native operating speed (e.g. typically MHz/GHz). The BootStrap firmware 116A, 116B, or 116c sends a digital signature and a hash code or value back to BMC 102 for authentication. The disclosed method avoids the transfer of a large SOC firmware image back to BMC 102 at slow bus speeds (e.g. typically kHz) at which SOC communicates with BMC 102.

Specifically, as illustrated in flow chart 300, at 312, BootStrap firmware 116A, 116B, or 116c reads the slave SOC firmware image from flash storage 114A, 114B, or 114N. At 314, BootStrap firmware 116A, 116B, or 116c extracts digital signature from the slave SOC firmware image. At 316, BootStrap firmware 116A, 116B, or 116c sends the digital signature to BMC 102 for authentication. At 318, BootStrap firmware 116A, 116B, or 116c calculates a cryptographic hash code or value of the SOC firmware image excluding the digital signature. At 320, BootStrap firmware 116A, 116B, or 116c sends the hash code or value to BMC 102.

At 322, BMC 102 performs a verification operation of the digital signature of the SOC firmware image using hash and public keys obtained from BMC security module 104. At 324, BMC 102 determines if one or more slave SOCs 110A, 100B, or 110N have firmware images that aren't authentic or authentic.

At 326, BMC 102 notifies users about the signature verification. If BMC 102 reports that these SOCs 110A, 110B, or 110N fail the signature verification, depending on requirements of the embedded system, BMC 102 may stop these SOCs 110A, 110B, or 110N from continuing executing untrusted firmware.

Figure 4:
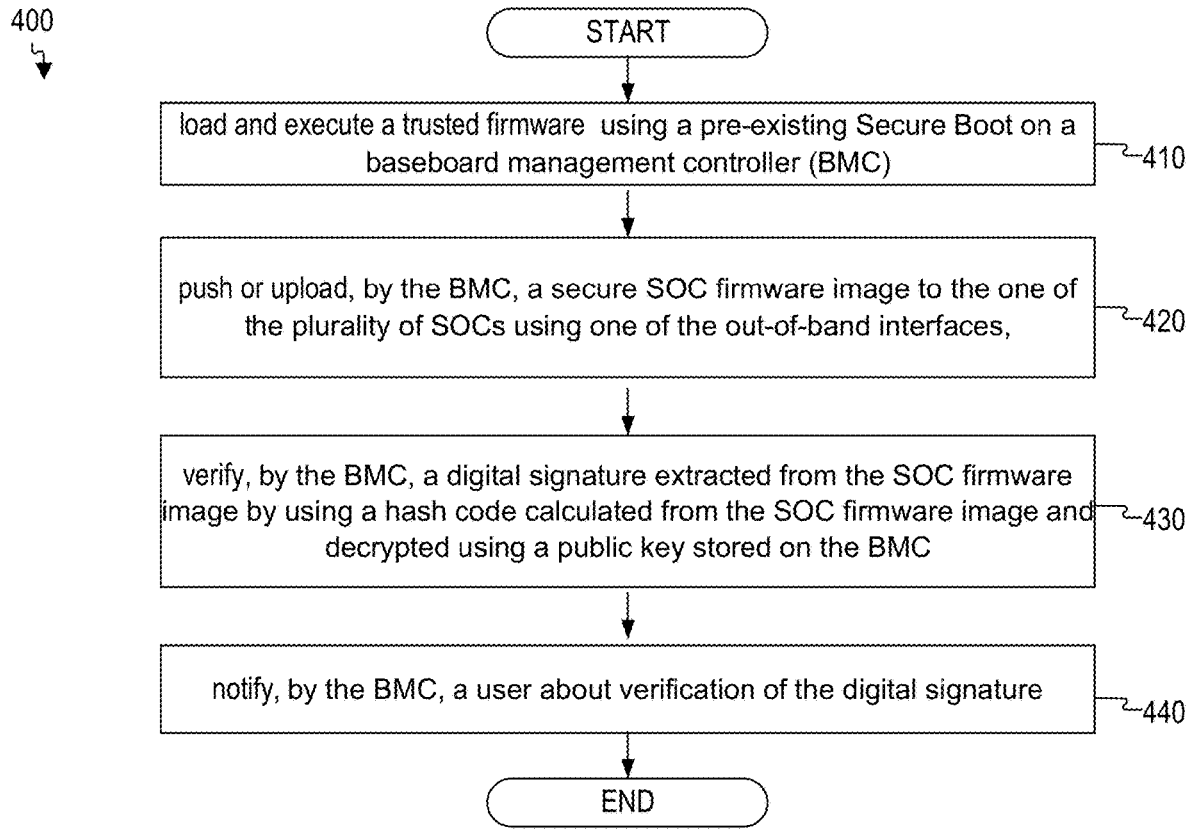
FIG. 4 is a flow chart illustrating the steps for authenticating firmware images in the embedded system of FIG. 1 in accordance with an embodiment of the disclosure.

FIG. 4 is a flow chart illustrating the steps for authenticating firmware images in the embedded system of FIG. 1 in accordance with an embodiment of the disclosure. Although example method 400 depicts a particular sequence of operations, the sequence may be altered without departing from the scope of the present disclosure. For example, some of the operations depicted may be performed in parallel or in a different sequence that does not materially affect the function of method 400. In other examples, different components of an example device or system that implements method 400 may perform functions at substantially the same time or in a specific sequence.

According to some examples, method 400 includes loading and executing a trusted firmware using a pre-existing Secure Boot on a BMC at block 410. For example, the BMC 102 as illustrated in FIG. 1 may load and execute a trusted firmware using a pre-existing Secure Boot on a BMC. The BMC is configured as a master for an embedded system comprising a plurality of System On Chips (SOCs) configured as slaves, out-of-band interfaces between the BMC and the plurality of SOCs, and a plurality of flash storages in electrical communication with the plurality of SOCs.

According to some examples, method 400 includes pushing or uploading a secure SOC firmware image to one of the plurality of SOCs using one of the out-of-band interfaces at block 420. For example, the BMC 102 as illustrated in FIG. 1 may push or upload a secure SOC firmware image to one of the plurality of SOCs using one of the out-of-band interfaces. Signature verification of a SOC firmware image is performed locally on one of the plurality of SOCs.

According to some examples, method 400 includes verifying a digital signature extracted from the SOC firmware image by using a hash code calculated from the SOC firmware image and decrypted using a public key stored on the BMC at block 430. For example, the BMC 102 as illustrated in FIG. 1 may verify a digital signature extracted from the SOC firmware image by using a hash code calculated from the SOC firmware image and decrypted using a public key stored on the BMC.

According to some examples, method 400 includes notifying a user about verification of the digital signature at block 440. For example, the BMC 102 as illustrated in FIG. 1 may notify a user about verification of the digital signature.

According to some examples, method 400 may also include reading the SOC firmware image from one of the plurality of flash storages. For example, the SOC firmware 116A, 116B, or 116N on one of the plurality of SOCs as illustrated in FIG. 1 may read the SOC firmware image from one of the plurality of flash storages.

According to some examples, method 400 may also include extracting the digital signature from the SOC firmware image. For example, the SOC firmware 116A, 116B, or 116N on one of the plurality of SOCs as illustrated in FIG. 1 may extract the digital signature from the SOC firmware image.

According to some examples, method 400 may also include calculating the hash code of the SOC firmware image. For example, the SOC firmware 116A, 116B, or 116N on one of the plurality of SOCs as illustrated in FIG. 1 may calculate the hash code of the SOC firmware image.

According to some examples, method 400 may also include encrypting the hash code of the SOC firmware image to form an encrypted hash code. For example, the SOC firmware 116A, 116B, or 116N on one of the plurality of SOCs as illustrated in FIG. 1 may encrypt the hash code of the SOC firmware image to form an encrypted hash code.

According to some examples, method 400 may also include sending the digital signature and encrypted hash code to the BMC. For example, the SOC firmware 116A, 116B, or 116N on one of the plurality of SOCs as illustrated in FIG. 1 may send the digital signature and encrypted hash code to the BMC.

According to some examples, method 400 may include stopping one of the plurality of SOCs from executing an untrusted firmware. For example, the BMC 102 as illustrated in FIG. 1 may stop one of the plurality of SOCs from executing an untrusted firmware.

Illustrative examples of the disclosure include: Please change the range of the aspects to ensure that the ranges do not cause mutually exclusive embodiments to overlap.

In some aspects, the out-of-band interface is one selected from a group consisting of JTAG, UART, LPC, SPI, eSPI, and I2C.

In some aspects, the SOC firmware image is a BootStrap image.

In some aspects, notifying a user about verification of the digital signature includes notifying the user that the SOC firmware image of one of the plurality of SOCs is authentic if the digital signature is valid.

In some aspects, notifying a user about verification of the digital signature includes notifying the user that the SOC firmware image of one of the plurality of SOCs fails the verification if the digital signature is invalid.

EXAMPLE

The following examples are for illustration purposes only. It will be apparent to those skilled in the art that many modifications, both to materials and methods, may be practiced without departing from the scope of the disclosure.

Testing was performed for BootStrap on Broadcom Expander SOC. BootStrap 116A executes locally on the Broadcom Expander SOC 110A at its native operating speed (e.g. 400 MHz) and sends results back to BMC 102 for authentication. As an example, times for verifying firmware images were compared by using the disclosed method of pushing a secure BootStrap image from BMC to SOC and a traditional method of pulling entire firmware images on Broadcom Expander SOCs, which feature Debug universal asynchronous receiver-transmitter (UART) ports 112A. The UART ports are computer hardware for asynchronous serial communication in which the data format and transmission speeds are configurable. In this testing, the UART ran at a speed up to 115200 baud.

The results are presented in Table 1 below. As shown in Table 1, a traditional method pulled or downloaded an entire firmware image from SOC using Debug UART port to perform digital signature verification. The total time for the traditional method was about 147 seconds, which was largely due to the time of about 140 seconds for pulling or downloading the entire firmware image.

TABLE 1

Comparison of total time for a disclosed method versus a traditional method

| Method | Time needed to push BootStrap to SOC | Time needed to pull entire F/W image | Time needed to verify F/W | Total Time |
|---|---|---|---|---|
| A traditional method of pulling an entire firmware image from SOC using Debug UART port to perform digital signature verification | ~6 seconds | ~140 seconds | ~1 second | ~147 seconds |
| A disclosed method of pushing a secure BootStrap image to SOC using Debug UART port while the BootStrap performs the signature verification locally on SOC | ~6 seconds | N/A | ~2 seconds | ~8 seconds |

The disclosed method avoids the traditional method of transferring a large firmware image back to the BMC over slower bus speeds (i.e. kHz) that are typically used to communicate with the SOCs or SOC devices. Specifically, the disclosed method pushed or uploaded a secure BootStrap image to SOC using Debug UART port while the BootStrap 116A performed the signature verification locally on SOC 110A. The total time for the disclosed method was about 8 seconds, which was reduced largely due to the elimination of pulling the entire firmware image from SOC 110A.

Figure 5:
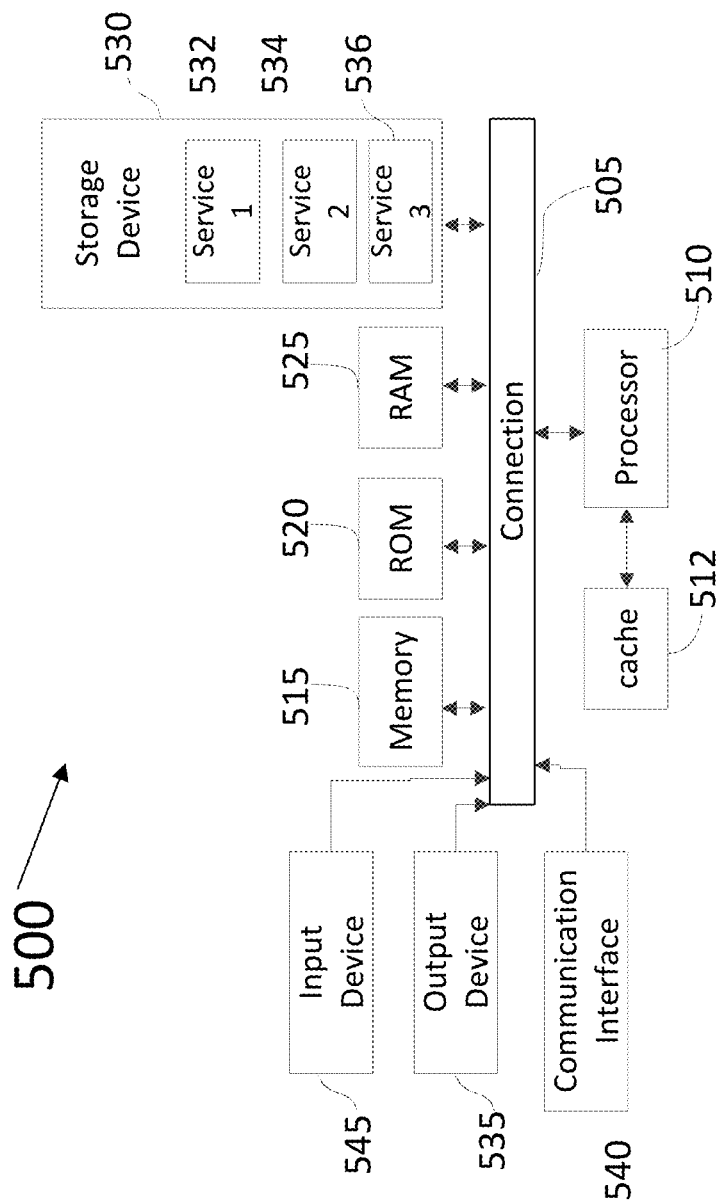
FIG. 5 shows an example of a system for implementing certain aspects of the present technology.

FIG. 5 shows an example of computing system 500, which can be for example any computing device making up the embedded system 100 or any component thereof in which the components of the system are in communication with each other using connection 505. Connection 505 can be a physical connection via a bus, or a direct connection into processor 510, such as in a chipset architecture. Connection 505 can also be a virtual connection, a networked connection, or a logical connection.

In some embodiments, computing system 500 is a distributed system in which the functions described in this disclosure can be distributed within a data center, multiple data centers, a peer network, etc. In some embodiments, one or more of the described system components represents many such components each performing some or all of the function for which the component is described. In some embodiments, the components can be physical or virtual devices.

Computing system 500 includes at least one processing unit (CPU or processor) 510 and connection 505 that couples various system components including system memory 515, such as read-only memory (ROM) 520 and random-access memory (RAM) 525 to processor 510. Computing system 500 can include a cache of high-speed memory 512 connected directly with, close to, or integrated as part of processor 510.

Processor 510 can include any general-purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of output mechanisms known to those of skill in the art. In some instances, multimodal systems can enable a user to provide multiple types of input/output to communicate with computing system 500. Computing system 500 can include communications interface 540, which can generally govern and manage the user input and system output. There is no restriction on operating on any particular hardware arrangement, and therefore the basic features here may easily be substituted for improved hardware or firmware arrangements as they are developed.

Storage device 530 can be a non-volatile memory device and can be a hard disk or other types of computer-readable media which can store data that are accessible by a computer, such as magnetic cassettes, flash memory cards, solid-state memory devices, digital versatile disks, cartridges, random access memories (RAMs), read-only memory (ROM), and/or some combination of these devices.

The storage device 530 can include software services, servers, services, etc., and when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

For clarity of explanation, in some instances, the present technology may be presented as including individual functional blocks including devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in the memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can include, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can include hardware, firmware, and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Having described several embodiments, it will be recognized by those skilled in the art that various modifications, alternative constructions, and equivalents may be used without departing from the spirit of the invention. Additionally, some well-known processes and elements have not been described to avoid unnecessarily obscuring the invention. Accordingly, the above description should not be taken as limiting the scope of the invention.

Those skilled in the art will appreciate that the presently disclosed embodiments teach by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the method and system, which, as a matter of language, might be said to fall therebetween.

What is claimed is:

1. A computer-implemented method for authenticating firmware images in an embedded system, the method comprising:
   loading and executing a trusted firmware using a pre-existing Secure Boot on a baseboard management controller (BMC), wherein the BMC is configured as a master for an embedded system comprising a plurality of System On Chips (SOCs) configured as slaves, out-of-band interfaces between the BMC and the plurality of SOCs, and a plurality of flash storages in electrical communication with the plurality of SOCs;
   pushing or uploading, by the BMC, a secure firmware image from a first storage device coupled to the BMC, to the one of the plurality of SOCs using one of the out-of-band interfaces such that a SOC firmware on the one of the plurality of SOCs is executed by the one of the plurality of SOCs;
   receiving, by the BMC, a digital signature extracted from a SOC firmware image from a second storage device coupled to the one of the plurality of SOCs by the SOC firmware on the one of the plurality of SOCs;
   verifying, by the BMC, the digital signature extracted from the SOC firmware image by using a hash code calculated from the SOC firmware image;
   decrypting the digital signature, by the BMC, using a public key stored on the BMC; and
   notifying, by the BMC, a user about verification of the digital signature.

2. The computer-implemented method of claim 1, wherein the out-of-band interface is one selected from a group consisting of JTAG, UART, LPC, SPI, eSPI, and I2C.

3. The computer-implemented method of claim 1, further comprises:
   reading, by the SOC firmware on the one of the plurality of SOCs, the SOC firmware image from the second storage device comprising one of the plurality of flash storages;
   calculating, by the SOC firmware on the one of the plurality of SOCs, the hash code of the SOC firmware image;
   encrypting, by the SOC firmware on the one of the plurality of SOCs, the hash code of the SOC firmware image to form an encrypted hash code; and
   sending, by the SOC firmware on the one of the plurality of SOCs, the digital signature and encrypted hash code to the BMC.

4. The computer-implemented method of claim 1, wherein the SOC firmware image is a BootStrap image.

5. The computer-implemented method of claim 1, wherein notifying a user about verification of the digital signature further comprises notifying the user that the SOC firmware image of one of the plurality of SOCs is authentic if the digital signature is valid.

6. The computer-implemented method of claim 1, wherein notifying a user about verification of the digital signature further comprises notifying the user that the SOC firmware image of one of the plurality of SOCs fails the verification if the digital signature is invalid.

7. The computer-implemented method of claim 6, further comprising stopping the one of the plurality of SOCs from executing an untrusted firmware.

8. A system comprising:
a storage device configured to store instructions;
a processor configured to execute the instructions and cause the processor to:
load and execute a trusted firmware use a pre-existing Secure Boot on a baseboard management controller (BMC), wherein the BMC is configured as a master for an embedded system comprising a plurality of System On Chips (SOCs) configured as slaves, out-of-band interfaces between the BMC and the plurality of SOCs, and a plurality of flash storages in electrical communication with the plurality of SOCs, push or uploading, by the BMC, a secure firmware image from a first storage device coupled to the BMC to the one of the plurality of SOCs using one of the out-of-band interfaces such that a SOC firmware on the one of the plurality of SOCs is executed by the one of the plurality of SOCs;
receive, by the BMC, a digital signature extracted from a SOC firmware image from a second storage device coupled to the one of the plurality of SOCs by the SOC firmware on the one of the plurality of SOCs;
verify, by the BMC, the digital signature extracted from the SOC firmware image by use a hash code calculated from the SOC firmware image;
decrypting the digital signature, by the BMC; and notify, by the BMC, a user about verification of the digital signature.

9. The system of claim 8, wherein the out-of-band interface is one selected from a group consisting of JTAG, UART, LPC, SPI, eSPI, and I2C.

10. The system of claim 8, wherein the processor is configured to execute the instructions and cause the processor to:
read, by the SOC firmware on the one of the plurality of SOCs, the SOC firmware image from the second storage device comprising one of the plurality of flash storages;
calculate, by the SOC firmware on the one of the plurality of SOCs, the hash code of the SOC firmware image;
encrypt, by the SOC firmware on the one of the plurality of SOCs, the hash code of the SOC firmware image to form an encrypted hash code; and
send, by the SOC firmware on the one of the plurality of SOCs, the digital signature and encrypted hash code to the BMC.

11. The system of claim 8, wherein the SOC firmware image is a BootStrap image.

12. The system of claim 8, wherein notifying a user about verification of the digital signature further comprises notifying the user that the SOC firmware image of one of the plurality of SOCs is authentic if the digital signature is valid.

13. The system of claim 8, wherein notifying a user about verification of the digital signature further comprises notifying the user that the SOC firmware image of one of the plurality of SOCs fails the verification if the digital signature is invalid.

14. The system of claim 13, wherein the processor is configured to execute the instructions and cause the processor to: stop the one of the plurality of SOCs from execute an untrusted firmware.

15. A non-transitory computer readable medium comprising instructions, the instructions, when executed by a computing system, cause the computing system to:
load and execute a trusted firmware use a pre-existing Secure Boot on a baseboard management controller (BMC), wherein the BMC is configured as a master for an embedded system comprising a plurality of System On Chips (SOCs) configured as slaves, out-of-band interfaces between the BMC and the plurality of SOCs, and a plurality of flash storages in electrical communication with the plurality of SOCs;
push or uploading, by the BMC, a secure firmware image from a first storage device coupled to the BMC to the one of the plurality of SOCs using one of the out-of-band interfaces such that a SOC firmware on the one of the plurality of SOCs is executed by the one of the plurality of SOCs;
receive, by the BMC, a digital signature extracted from a SOC firmware image from a second storage device coupled to the one of the plurality of SOCs by the SOC firmware on the one of the plurality of SOCs;
verify, by the BMC, the digital signature extracted from the SOC firmware image by use a hash code calculated from the SOC firmware image;
decrypting the digital signature, by the BMC; and
notify, by the BMC, a user about verification of the digital signature.

16. The computer readable medium of claim 15, wherein the out-of-band interface is one selected from a group consisting of JTAG, UART, LPC, SPI, eSPI, and I2C.

17. The computer readable medium of claim 15, wherein the computer readable medium further comprises instructions that, when executed by the computing system, cause the computing system to:
read, by the SOC firmware on the one of the plurality of SOCs, the SOC firmware image from the second storage device comprising one of the plurality of flash storages;
calculate, by the SOC firmware on the one of the plurality of SOCs, the hash code of the SOC firmware image;
encrypt, by the SOC firmware on the one of the plurality of SOCs, the hash code of the SOC firmware image to form an encrypted hash code; and
send, by the SOC firmware on the one of the plurality of SOCs, the digital signature and encrypted hash code to the BMC.

18. The computer readable medium of claim 15, the SOC firmware image is a BootStrap image.

19. The computer readable medium of claim 15, notifying a user about verification of the digital signature further comprises notifying the user that the SOC firmware image of one of the plurality of SOCs is authentic if the digital signature is valid.

20. The computer readable medium of claim 15, notifying a user about verification of the digital signature further comprises notifying the user that the SOC firmware image of one of the plurality of SOCs fails the verification if the digital signature is invalid.

* * * * *